United States Patent
Zhao (10) Patent No.: US 7,586,295 B2
(45) Date of Patent: Sep. 8, 2009

(54) VOLTAGE UP-CONVERSION CIRCUIT

(75) Inventor: Bin Zhao, Irvine, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 0 days.

(21) Appl. No.: 12/157,241

(22) Filed: Jun. 9, 2008

(65) Prior Publication Data
US 2008/0246457 A1 Oct. 9, 2008

Related U.S. Application Data

(63) Continuation of application No. 11/448,651, filed on Jun. 6, 2006, now Pat. No. 7,408,330.

(51) Int. Cl.
*G05F 1/00* (2006.01)
(52) U.S. Cl. .................................... 323/266; 323/288
(58) Field of Classification Search ................. 323/266, 323/288
See application file for complete search history.

(56) References Cited

U.S. PATENT DOCUMENTS

| 5,430,366 | A | * | 7/1995 | Erckert et al. ............... 323/282 |
| 2005/0024126 | A1 | | 2/2005 | Suwa et al. |
| 2007/0063760 | A1 | | 3/2007 | Stopel |

* cited by examiner

*Primary Examiner*—Shawn Riley (57) ABSTRACT

According to one exemplary embodiment, a voltage up-conversion circuit includes a modulated voltage generator circuit, where the modulated voltage generator circuit is configured to receive an input voltage and generate a modulated voltage, and where the modulated voltage generator circuit includes at least one transistor. The voltage up-conversion circuit further includes a switching circuit coupled to the modulated voltage generator circuit, where the switching circuit is configured to couple the modulated voltage to a load capacitor when the modulated voltage is at a high level and decouple the modulated voltage to the load capacitor when the modulated voltage is at a low level. In the voltage up-conversion circuit, the load capacitor reaches a voltage greater a breakdown voltage of the at least one transistor in the modulated voltage generator circuit. The breakdown voltage can be a reliability breakdown voltage.

20 Claims, 4 Drawing Sheets

VOLTAGE UP-CONVERSION CIRCUIT

This is a continuation of application Ser. No. 11/448,651, Filed Jun. 6, 2006 now U.S. Pat. No. 7,408,330.

BACKGROUND OF THE INVENTION

1. Field of the Invention

The present invention is generally in the field of electrical circuits. More particularly, the invention is in the field of voltage up-conversion circuits.

2. Related Art

Portable and mobile electronic devices, such as wireless communication devices, typically include analog and digital systems that require multiple operating voltages. The multiple operating voltages required by analog and digital systems are typically provided by on-chip DC-DC voltage converters, which can utilize a single external voltage source, such as a battery. However, battery voltage can drop significantly below 5 volts, which is a required operating voltage for some system interface circuits. As a result, analog and digital systems in portable and mobile electronic devices typically require on-chip voltage up-conversion.

Voltage up-conversion is typically provided by using switching regulators, such as a Cuk converters, or switched-capacitor or charge pump converters. However, both of these approaches typically require high voltage transistors, such as 5 volt transistors, to handle high output voltage. However, current technologies used for fabrication of semiconductor dies for core logic, analog, and I/O circuits typically provide transistors that operate at significantly lower voltages than 5 volts. Although 5 volt transistors can be added for a voltage up-conversion circuit in the fabrication process, adding 5 volt transistors increases fabrication process complexity, which increases manufacturing cost. In another approach, a separate semiconductor die can be fabricated using a 5 volt process for a voltage up-conversion circuit. However, this approach undesirably increases system integration complexity and system cost.

Thus, there is a need in the art for a low cost voltage up-conversion circuit for analog and digital systems in portable and mobile electronic devices, such as wireless communication devices.

SUMMARY OF THE INVENTION

The present invention is directed to a voltage up-conversion circuit using low voltage transistors. The present invention overcomes the need in the art for a low cost voltage up-conversion circuit for analog and digital systems in portable and mobile electronic devices, such as wireless communication devices.

According to one exemplary embodiment, a voltage up-conversion circuit includes a modulated voltage generator circuit, where the modulated voltage generator circuit is configured to receive an input voltage and generate a modulated voltage, and where the modulated voltage generator circuit includes at least one transistor. The at least one transistor can be a field effect transistor (FET), for example. The voltage up-conversion circuit further includes a switching circuit coupled to the modulated voltage generator circuit, where the switching circuit is configured to couple the modulated voltage to a load capacitor when the modulated voltage is at a high level and decouple the modulated voltage to the load capacitor when the modulated voltage is at a low level. In the voltage up-conversion circuit, the load capacitor reaches a voltage greater than a breakdown voltage of the at least one transistor in the modulated voltage generator circuit. The breakdown voltage can be a reliability breakdown voltage.

According to this exemplary embodiment, the switching circuit includes at least one transistor, where the load capacitor reaches a voltage greater than a breakdown voltage of the at least one transistor in the switching circuit. The voltage up-conversion circuit further includes a control circuit coupled to the switching circuit, where the control circuit takes the input voltage and generates a control voltage, and where the control voltage causes the switching circuit to couple the modulated voltage to the load capacitor when the modulated voltage is at the high level and decouple the modulated voltage from the load capacitor when the modulated voltage is at the low level. The control circuit can include at least one transistor, where the load capacitor reaches a voltage greater than a breakdown voltage of the at least one transistor in the control circuit. The control voltage generated by the control circuit and the modulated voltage generated by the modulated voltage generator circuit can be approximately 180 degrees out of phase.

According to this exemplary embodiment, the voltage up-conversion circuit further includes a timing circuit coupled to the modulated voltage generator circuit and the control circuit, where the timing circuit is configured to cause the modulated voltage generator circuit to generate the modulated voltage and to cause the control circuit to couple the modulated voltage to the load capacitor only when the modulated voltage is at the high level and decouple the modulated voltage from the load capacitor when the modulated voltage is at the low level. The timing circuit can be further configured to cause the control circuit to couple the modulated voltage to the load capacitor only when the modulated voltage is at the high level. Other features and advantages of the present invention will become more readily apparent to those of ordinary skill in the art after reviewing the following detailed description and accompanying drawings.

DETAILED DESCRIPTION OF THE INVENTION

The present invention is directed to a voltage up-conversion circuit using low voltage transistors. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art.

The drawings in the present application and their accompanying detailed description are directed to merely exemplary embodiments of the invention. To maintain brevity, other embodiments of the invention which use the principles of the present invention are not specifically described in the present application and are not specifically illustrated by the present drawings.

It is noted that although an input voltage of approximately 2.8 volts is utilized to illustrate the present invention's voltage up-conversion circuit, the invention's voltage up-conversion circuit can be utilized to convert an input voltage to a higher output voltage, where the input voltage can be less than or greater than 2.8 volts. As will be discussed in detail below, the present invention provides an innovative up-conversion circuit that converts an input voltage to a higher output voltage by using low-voltage transistors having a breakdown voltage that is less than the output voltage.

Figure 1:
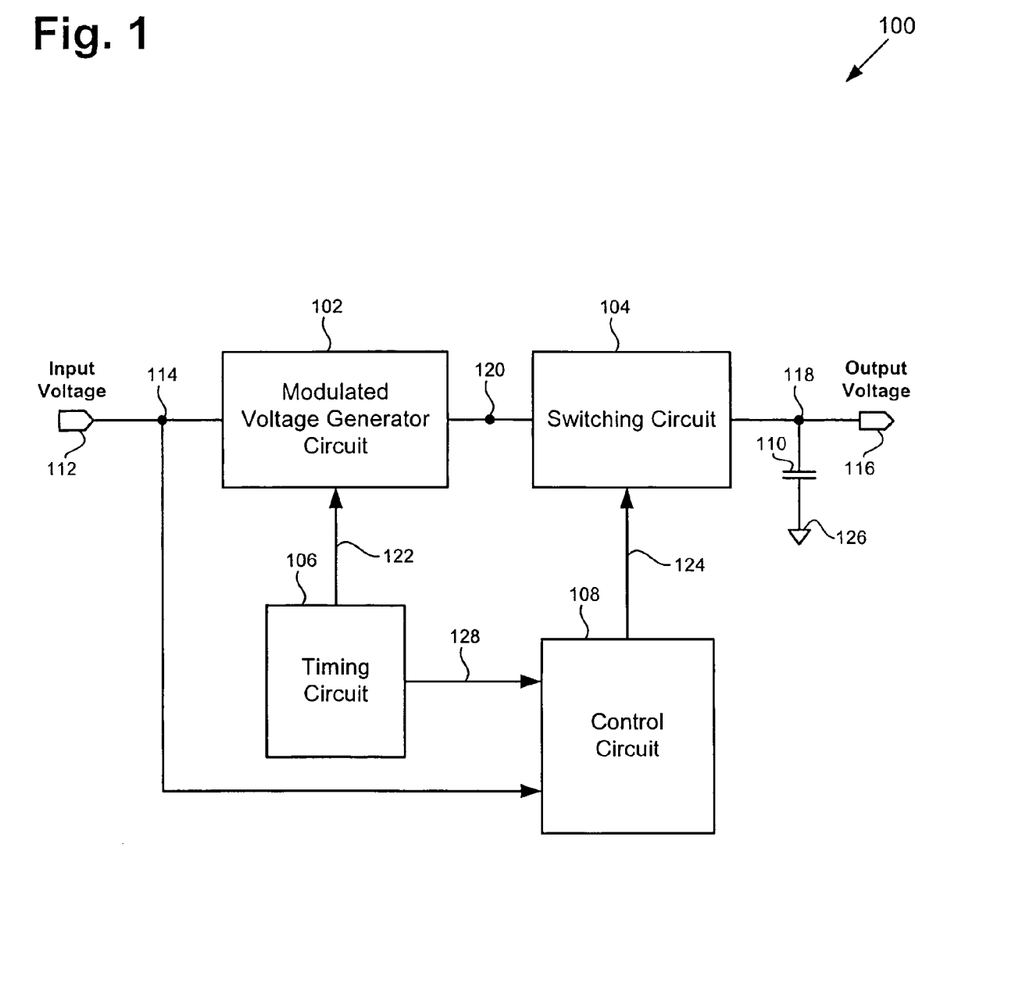
FIG. 1 is a block diagram of an exemplary voltage up-conversion circuit in accordance with one embodiment of the present invention.

FIG. 1 shows a block diagram of an exemplary voltage up-conversion circuit in accordance with one embodiment of the present invention. Certain details and features have been left out of FIG. 1 that are apparent to a person of ordinary skill in the art. Voltage up-conversion circuit 100 includes modulated voltage generator circuit 102, switching circuit 104, timing circuit 106, control circuit 108, and load capacitor 110. Voltage up-conversion circuit 100 can be configured to receive input voltage 112 at node 114, convert input voltage 112 to a higher voltage, and output the higher, up-converted voltage as output voltage 116 at node 118. By way of example, input voltage 112 can be equal to approximately 2.8 volts and output voltage 116 can be equal to approximately 5.0 volts.

As shown in FIG. 1, modulated voltage generator circuit 102 is coupled to switching circuit 104 at node 120. Modulated voltage generator circuit 102 can be configured to receive input voltage 112 at node 114 and control signals from timing circuit 106 via bus 122 and output a modulated voltage, which can alternate between a low voltage level, which can be approximately equal to input voltage 112, and a high voltage level, at node 120 in response to appropriate control signals provided by timing circuit 106. By way of example, the low voltage level can be approximately equal to 2.8 volts. By way of example, the high voltage level can be approximately equal to 5.6 volts. In other embodiments, the low voltage level and the high voltage level of the modulated voltage outputted by modulated voltage generator circuit 102 can be less than or greater than 2.8 volts and 5.6 volts, respectively.

Switching circuit 104 can be configured to receive a modulated voltage from modulated voltage generator circuit 102 at node 120 and a control voltage from control circuit 108 via line 124 and to couple node 120 to node 118 when the modulated voltage at node 120 is at a high level and decouple node 120 from node 118 when the modulated voltage at node 120 is at a low level. Also shown in FIG. 1, a first terminal of load capacitor 110 is coupled to node 118 and a second terminal of load capacitor 110 is coupled to ground 126. Load capacitor 110 provides a reasonably stable DC voltage (i.e. output voltage 116). For example, output voltage 116 can be equal to approximately 5 volts at node 118. The capacitance value of load capacitor 110 can be selected to provide a desirably low ripple voltage at node 118. Further shown in FIG. 1, control circuit 108 is coupled to switching circuit 104 via line 124, timing circuit 106 via bus 128, and input voltage 112 at node 114. Control circuit 108 can be configured to receive input voltage 112 at node 114 and control signals from timing circuit 106 via bus 128 and provide an appropriate control voltage to switching circuit 104 so as to turn on switching circuit 104 only when the modulated voltage generated by modulated voltage generator circuit 102 at node 120 is at a high level.

Also shown in FIG. 1, timing circuit 106 is coupled to modulated voltage generator circuit 102 via bus 122 and coupled to control circuit 108 via bus 128. Timing circuit 106 can be configured to generate appropriately phased control signals on bus 122 so as to cause modulated voltage generator circuit 102 to generate a modulated voltage at node 120 and to generate appropriately phased control signals on bus 128 so as to cause control circuit 108 to turn on switching circuit 104 only when the modulated voltage generated by modulated voltage generator circuit 102 at node 120 is at a high level. In the present embodiment, the control signals provided by timing circuit 106 can be generated from six clock signals of the same frequency, where each clock signal has a different phase and duty cycle. In another embodiment, the control signals provided by timing circuit 106 can be generated from eight clock signals of the same frequency, where each clock signal has a different phase and duty cycle. It is noted that in the present application, a control signal and an inversion of the control signal (i.e. the inverted control signal) refer to the same control signal.

All of the transistors that are utilized in voltage up-conversion circuit 100 are low-voltage transistors, where each low-voltage transistor has a "breakdown voltage" that is less than output voltage 116. By way of background, the "breakdown voltage" of a transistor can include a hard breakdown voltage and a reliability breakdown voltage. A voltage greater than a hard breakdown voltage can cause an immediate breakdown (i.e. failure) of the transistor, while a voltage greater than a reliability breakdown voltage can cause the transistor to breakdown in a period less than the required lifetime, thereby reducing the reliability of the transistor. A transistor's reliability breakdown voltage refers to a maximum voltage that can be applied between any two terminals of the transistor without reducing the lifetime of the transistor. Thus, the present invention's voltage up-conversion circuit uses low-voltage transistors, where each low-voltage transistor has a reliability breakdown voltage that is less than the output voltage generated by the voltage up-conversion circuit. Thus, the difference in voltage between any two terminals of any transistor in the invention's voltage up-conversion circuit is less than the reliability breakdown voltage of the transistor. By way of example, the reliability breakdown voltage of each low-voltage transistor in voltage up-conversion circuit 100 can be equal to approximately 3.6 volts.

Thus, by providing a voltage up-conversion circuit comprising transistors having a reliability breakdown voltage that is less than the output voltage generated by voltage up-conversion circuit, the present invention provides a voltage up-conversion circuit that can be manufactured at low cost and integrated in an analog and digital system in one semiconductor die.

Figure 2:
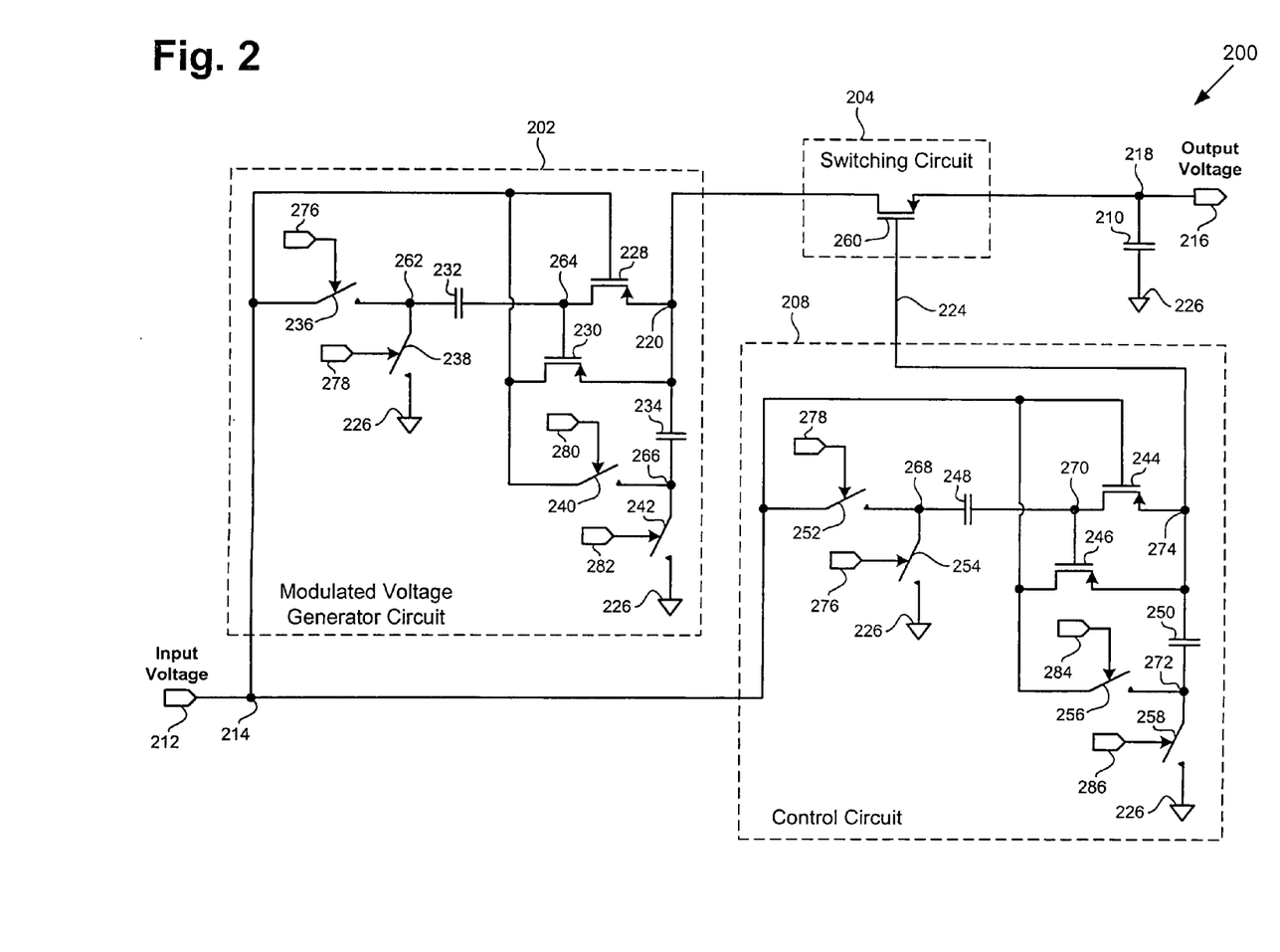
FIG. 2 illustrates a circuit diagram of an exemplary voltage up-conversion circuit in accordance with one embodiment of the present invention.

FIG. 2 shows a schematic diagram of an exemplary voltage up-conversion circuit in accordance with one embodiment of the present invention. In FIG. 2, modulated voltage generator circuit 202, switching circuit 204, control circuit 208, load capacitor 210, input voltage 212, nodes 214, 218, and 220, output voltage 216, and ground 226 correspond, respectively, to modulated voltage generator circuit 102, switching circuit 104, control circuit 108, load capacitor 110, input voltage 112, nodes 114, 118, and 120, output voltage 116, and ground 126 in FIG. 1. Voltage up-conversion circuit 200 includes modulated voltage generator circuit 202, switching circuit 204, and control circuit 208. Modulated voltage generator circuit 202 includes transistors 228 and 230, capacitors 232 and 234, and switches 236, 238, 240, and 242, control circuit 208 includes transistors 244 and 246, capacitors 248 and 250, and switches 252, 254, 256, and 258, and switching circuit 204 includes transistor 260.

As shown in FIG. 2, a first terminal of switch 236 is coupled to node 214 and a second terminal of switch 236, a first terminal of switch 238 and a first terminal of capacitor 232 are coupled to node 262. As also shown in FIG. 2, a second terminal of switch 238 is coupled to ground 226 and a second terminal of capacitor 232, the drain terminal of transistor 228, and the gate terminal of transistor 230 are coupled to node 264. Further shown in FIG. 2, the source terminals of transistors 228 and 230 are coupled to a first terminal of capacitor 234 at node 220 and the gate terminal of transistor 228, the drain terminal of transistor 230, and a first terminal of switch 240 are coupled to node 214. Transistors 228 and 230 can each be a field-effect transistor (FET), such as p-channel FET (PFET).

Also shown in FIG. 2, a second terminal of capacitor 234 is coupled to a second terminal of switch 240 and a first terminal of switch 242 at node 266 and a second terminal of switch 242 is coupled to ground 226. Switches 236, 238, 240, and 242 can each comprise a FET. In the present embodiment, switches 236 and 240 each comprise a PFET and switches 238 and 242 each comprise an n-channel field-effect transistor (NFET). Further shown in FIG. 2, control signals 276, 278, 280, and 282 are coupled to respective third terminals (i.e. control terminals) of switches 236, 238, 240, and 242. Control signals 276, 278, 280, and 282 can be provided by timing circuit 106 in FIG. 1. Control signals 276, 278, 280, and 282 will be further discussed below in relation to FIG. 3.

Also shown in FIG. 2, a first terminal of switch 252 is coupled to node 214 and a second terminal of switch 252, a first terminal of switch 254 and a first terminal of capacitor 248 are coupled to node 268. Further shown in FIG. 2, a second terminal of switch 254 is coupled to ground 226 and a second terminal of capacitor 248, the drain terminal of transistor 244, and the gate terminal of transistor 246 are coupled to node 270. Further shown in FIG. 2, the source terminals of transistors 244 and 246 are coupled to a first terminal of capacitor 250 at node 274 and the gate terminal of transistor 244, the drain terminal of transistor 246, and a first terminal of switch 256 are coupled to node 214. Transistors 244 and 246 can each be a FET, such as a PFET.

Also shown in FIG. 2, a second terminal of capacitor 250 is coupled to a second terminal of switch 256 and a first terminal of switch 258 at node 272 and a second terminal of switch 258 is coupled to ground 226. Switches 252, 254, 256, and 258 can each comprise a FET. In the present embodiment, switches 252 and 256 each comprise a PFET and switches 254 and 258 each comprise an NFET. Further shown in FIG. 2, control signals 278, 276, 284, and 286 are coupled to respective third terminals (i.e. control terminals) of switches 252, 254, 256, and 258. Control signals 278, 276, 284, and 286 can be provided by timing circuit 106 in FIG. 1. Control signals 276, 278, 284, and 286 will be further discussed below in relation to FIG. 3.

Also shown in FIG. 2, switching circuit 204 can be a single switch, and the switch can be a single transistor (i.e. transistor 260), which is a PFET in the present embodiment. The drain terminal of transistor 260 is coupled to node 220, the gate terminal of transistor 260 is coupled to node 274 via line 224, and the source terminal of transistor 260 is coupled to a first terminal of load capacitor 210 at node 218, which also provides output voltage 216. In another embodiment, transistor 260 may be a different type of FET. Further shown in FIG. 2, a second terminal of load capacitor 210 is coupled to ground 226.

In voltage up-conversion circuit 200, each transistor is a low-voltage transistor having a reliability breakdown voltage that is less than output voltage 216. Furthermore, each transistor in modulated voltage generator circuit 202 is a low-voltage transistor having a reliability breakdown voltage that is less than the high level of the modulated voltage generated at node 220. Also, each transistor in control circuit 208 is a low-voltage transistor having a reliability breakdown voltage that is less than the high level of the control voltage generated at node 274. Using low-voltage transistors to manage high voltage (i.e. the high level of the control voltage generated at node 274) without having the terminal to terminal voltage of the transistor larger than the reliability breakdown voltage is achieved by appropriate timing arrangement of control signals 276, 278, 280, 282, 284, and 286. Thus, the voltage difference between any two terminals of each transistor in voltage up-conversion circuit 200 is managed to be less than the reliability breakdown voltage of the transistor. Using low-voltage transistors to provide a high voltage output (i.e. output voltage 216) without reliability problems is achieved in voltage up-conversion circuit 200 by appropriate timing arrangement of control signals 276, 278, 280, 282, 284, and 286.

In the present embodiment, each of PFETs 228, 230, 244, 246, and 260 also includes a body terminal (not shown in FIG. 2), which is connected to the source terminal. As discussed above, in the present embodiment, each of switches 236, 240, 252, and 256 can be implemented as a PFET and each of switches 238, 242, 254, and 258 can be implemented as an NFET. When each of switches 236, 240, 252, and 256 is implemented as a PFET, the source terminal and the body terminal of each PFET is connected to node 214. Also, when each of switches 238, 242, 254, and 258 is implemented as an NFET, the source terminal and the body terminal of each NFET is connected to ground 226. In an embodiment in which one or more of switches 236, 240, 252, and 256 is implemented as an NFET, the respective control signals that control the switches that are implemented as NFETs would be inverted. In an embodiment in which one or more of switches 238, 242, 254, and 258 is implemented as a PFET, the respective control signals that control the switches that are implemented as PFETs would be inverted. In the present embodiment, load capacitor 210 and capacitor 234 are situated off-chip (i.e. off of the semiconductor die on which the remaining components of voltage up-conversion circuit 200 are situated). In one embodiment, load capacitor 210 and capacitor 234 are situated on-chip.

Figure 3:
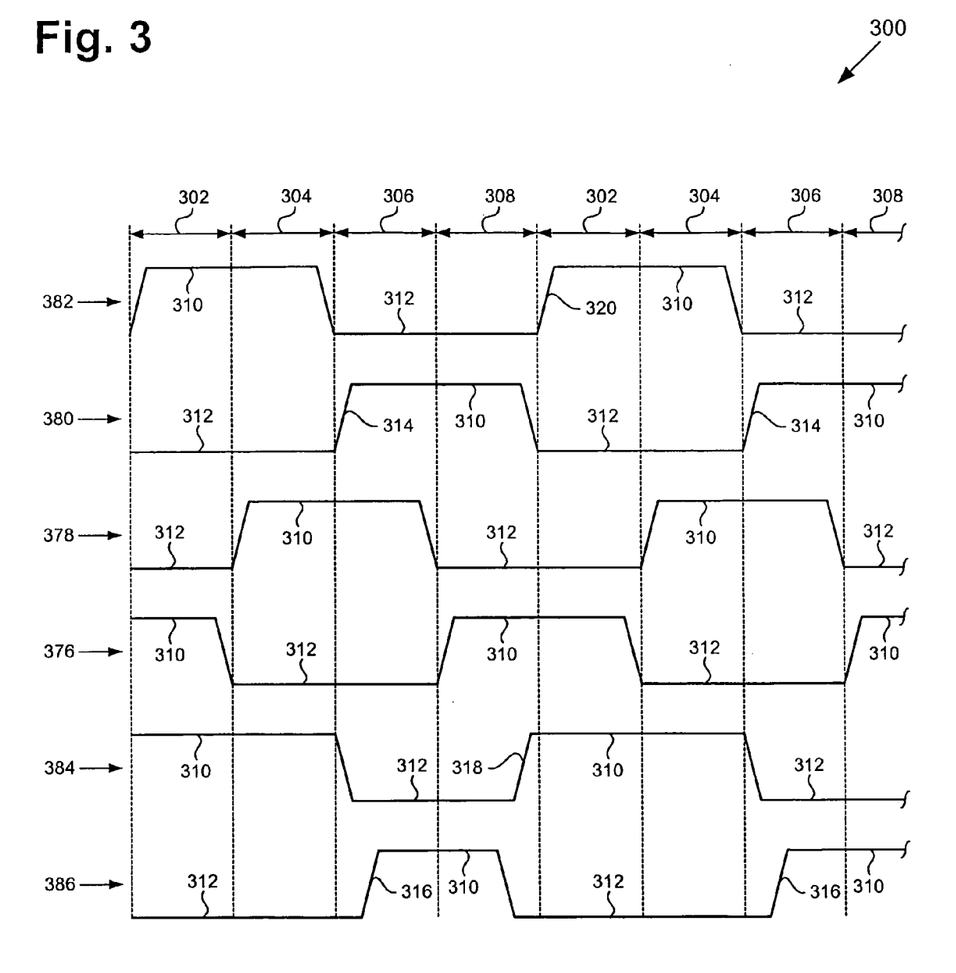
FIG. 3 illustrates a timing diagram including exemplary control signals for an exemplary voltage up-conversion circuit in accordance with one embodiment of the present invention.

FIG. 3 illustrates an exemplary timing diagram for exemplary control signals for voltage up-conversion circuit 200 in FIG. 2 in accordance with one embodiment of the present invention. In FIG. 3, control signals 376, 378, 380, 382, 384, and 386 (hereinafter "control signals 376 through 386") correspond, respectively, to control signals 276, 278, 280, 282, 284, and 286 in voltage up-conversion circuit 200 in FIG. 2. Timing diagram 300 includes control signals 376 through 386 and time periods 302, 304, 306, and 308.

As shown in FIG. 3, control signals 382 and 380 comprise a pair of non-overlapped signals, where control signal 382 remains at a low voltage level whenever control signal 380 transitions to a high voltage level and vice versa. However, control signals 382 and 380 can each be at a low voltage level at the same time. Similarly, control signals 378 and 376 and control signals 384 and 386 also comprise respective pairs of non-overlapped signals. Also shown in FIG. 3, control signal 382 transitions from low voltage level 312 to high voltage level 310 at the beginning of time period 302, transitions from high voltage level 310 to low voltage level 312 at the end of time period 304, and remains at low voltage level 312 in time periods 306 and 308. Further shown in FIG. 3, control signal 380 is at low voltage level 312 in time periods 302 and 304, transitions from low voltage level 312 to high voltage level 310 at the beginning of time period 306, and transitions from high voltage level 310 to low voltage level 312 at the end of time period 308.

Also shown in FIG. 3, control signal 378 is at low voltage level 312 in time period 302, transitions from low voltage level 312 to high voltage level 310 at the beginning of time period 304, remains at high voltage level 310 until transitioning to low voltage level 312 at the end of time period 306, and remains at low voltage level 312 during time period 308. Further shown in FIG. 3, control signal 376 is at high voltage level 310 in time period 302, transitions from high voltage level 310 to low voltage level 312 at the end of time period 302, remains at low voltage level 312 in time periods 304 and 306, and transitions from low voltage level 312 to high voltage level 310 close to the beginning of time period 308.

Also shown in FIG. 3, control signal 384 is at high voltage level 310 in time periods 302 and 304, transitions from high voltage level 310 to low voltage level 312 at the beginning of time period 306, and remains at low voltage level 312 until transitioning to high voltage level 310 at the end of time period 308. Further shown in FIG. 3, control signal 386 is at low voltage level 312 in time periods 302 and 304, transitions from low voltage level 312 to high voltage level 310 close to the beginning of time period 306, and transitions from high voltage level 310 to low voltage level 312 close to the end of time period 308.

Also shown in FIG. 3, rising edge 314 of control signal 380 leads rising edge 316 of control signal 386 and rising edge 318 of control signal 384 leads rising edge 320 of control signal 382. For example, low voltage level 312 can be approximately 0 volts and high voltage level 310 can be approximately 2.8 volts. Control signals 376, 378, 380, 382, 384, and 386 can be generated by a timing circuit, such as timing circuit 106 in FIG. 1, comprising low-voltage transistors, where each low-voltage transistor has a reliability breakdown voltage that is less than output voltage 216 in FIG. 2.

The control signals (i.e. control signals 376 through 386) in FIG. 3 are used in conjunction with voltage up-conversion circuit 200 in FIG. 2 such that when a control signal (i.e. control signals 376 through 386) is at high voltage level 310, a corresponding switch in voltage up-conversion circuit 200 is closed, and when the control signal (i.e. controls signals 376 through 386) at low voltage level 312, the corresponding switch in voltage up-conversion circuit 200 is open. For example, when control signal 380 is at respective high voltage level 310 or low voltage level 310, switch 240 in FIG. 2 is closed or open. In the present embodiment, if a switch (e.g. switches 236, 240, 252, and 256) in voltage up-conversion circuit 200 in FIG. 2 is implemented as a PFET, the corresponding control signal in FIG. 3 is inverted, and if a switch (e.g. switches 238, 242, 254, and 258) is implemented as an NFET, the corresponding control signal in FIG. 3 is not inverted. For example, since switch 252 is implemented as a PFET in the present embodiment, control signal 378 is inverted before being coupled to switch 252.

The operation of voltage up-conversion circuit 200 in FIG. 2 will now be discussed in relation to time periods 302, 304, 306, and 308 in timing diagram 300 in FIG. 3, where input voltage 212 comprises a low voltage of approximately 2.8 volts.

In time period 302, control signals 376 and 382 are at high voltage level 310, which causes respective switches 236 and 242 to close, and control signals 378 and 380 are at low voltage level 312, which causes respective switches 238 and 240 to open. As a result, 2.8 volts, which is supplied at node 214 by input voltage 212, is coupled to node 262 and node 266 is coupled to ground 226, which is at approximately 0 volts. In time period 302, node 220, which is also the output of modulated voltage generator circuit 202, is floating at approximately 2.8 volts. Control signal 376 also causes switch 254 to close and control signal 378 also causes switch 252 to open. Also in time period 302, transistors 228 and 230 are off.

Also in time period 302, control signal 384 is at high voltage level 310, which causes switch 256 to close, and control signal 386 is at low voltage level 312, which causes switch 258 to open. Also, in time period 302, transistor 244 is on because approximately 2.8 volts is applied to its (i.e. transistor 244) gate while 5.6 volts is applied to its source and drain and transistor 246 is off because approximately 5.6 volts is applied to its (i.e. transistor 246) gate while its source voltage is approximately 5.6 volts and its drain voltage is approximately 2.8 volts. As a result, approximately 2.8 volts at node 214 is coupled to the second terminal of capacitor 250 at node 272. As a result of charge conservation in capacitor 250, node 274, which is coupled to the first terminal of capacitor 250, increases to approximately 5.6 volts. By way of background, charge conservation causes a voltage on one node of a capacitor to increase or decrease when the voltage on other node of the capacitor is increased or decreased. Node 274, which also provides a control voltage on line 224 that is outputted by control circuit 208, is coupled to the gate of transistor 260 (i.e. an input of switching circuit 204). As a result, transistor 260 turns off because its source voltage and its drain voltage are less than its gate voltage, which causes switching circuit 204 to decouple node 220 (i.e. the output of modulated voltage generator circuit 202) from load capacitor 210 at node 218.

In time period 304, the voltage levels of respective control signals 380, 382, 384, and 386 do not change. However, control signal 378 transitions to high voltage level 310, which causes switch 238 to close, and control signal 376 transitions to low voltage level 312, which causes switch 236 to open. As a result, node 262 is at approximately 0 volts. Thus, when node 262 decreases to approximately 0 volts in time period 304, node 264, which was at approximately 3.3 volts in previous time period 302, decreases to approximately 1.4 volts and causes transistor 230 to turn on. As a result, approximately 2.8 volts is provided at node 220 (i.e. the output of modulated voltage generator circuit 202). Also in time period 304, transistor 228 remains turned off.

Also in time period 304, control signal 378 causes switch 252 to close and control signal 376 causes switch 254 to open, which couples approximately 2.8 volts to the first terminal of capacitor 248. In time period 304, transistor 246 remains turned off, transistor 244 remains turned on, and node 274 (i.e. the output of control circuit 208) remains at approximately 5.6 volts. Thus, transistor 260 remains turned off and node 220 continues to be decoupled from node 218 by switching circuit 204.

In time period 306, control signals 382 and 384 transition to low voltage level 312, control signals 380 and 386 transition to high voltage level 310, control signal 378 remains at high voltage level 310, and control signal 376 remains at low voltage level 312. As a result, switch 242 opens and switch 240 closes to cause node 266 to be at approximately 2.8 volts, which causes node 220 to increase to approximately 5.6 volts because of charge conservation in capacitor 234. Also, transistor 228 turns on and transistor 230 turns off, which isolates node 220 from node 214, causes node 220 (i.e. the output of modulated voltage generator circuit 202) to be at approximately 5.6 volts, and brings node 264 to approximately 5.6 volts.

Also in time period 306, control signal 386 causes switch 258 to close and control signal 384 causes switch 256 to open, which causes the second terminal of capacitor 250 (at node 272) to decrease to approximately 0 volts. As a result of charge conservation, node 274, which is coupled to the first terminal of capacitor 250, decreases to approximately 2.8 volts. Then transistor 244 will be turned on momentarily and it (i.e. transistor 244) will be turned off again when node 270 decreases to approximately 3.3 volts. Thus, transistor 246 remains turned off. As a result, a control voltage (on line 224) of approximately 2.8 volts from node 274 is coupled to the gate of transistor 260, which causes transistor 260 to turn on and cause switching circuit 204 to couple 5.6 volts at node 220 (i.e. the output of modulated voltage generator circuit 202) to a first terminal of load capacitor 210 at node 218. As a result, load capacitor 210 can be charged up to 5.6 volts. If there is a current loading from the first terminal of capacitor 210, the voltage will be slightly smaller (e.g. approximately 5 volts).

In time period 308, control signals 382 and 384 remain at low voltage level 312, control signals 380 and 386 remain at high voltage level 310, control signal 378 transitions to low voltage level 312, and control signal 376 transitions to high voltage level 310. As a result, switch 236 closes and switch 238 opens, which causes node 262 to increase to approximately 2.8 volts. However, node 220 remains at approximately 5.6 volts, since transistor 230 remains turned off, transistor 228 remains turned on, switch 240 remains closed, and switch 242 remains open. Also in time period 308, control signal 378 causes switch 252 to open and control signal 376 causes switch 254 to close, which causes node 268 to decrease from approximately 2.8 volts to approximately 0 volts. As a result, node 270 decreases from approximately 3.3 volts to approximately 1.4 volts, which causes transistor 246 to turn on while transistor 244 remains off. As a result, node 274 remains at approximately 2.8 volts, which causes switching circuit 204 to continue to couple node 220 (i.e. the output of modulated voltage generator circuit 202) to the first terminal of load capacitor 210 at node 218.

Thus, modulated voltage generator circuit 202 generates a modulated voltage at node 220 that alternates between a low voltage level of approximately 2.8 volts in time periods 302 and 304 and a high voltage level of approximately 5.6 volts in time periods 306 and 308. Also, control circuit 208 provide a control voltage on line 224 from node 274 that alternates between approximately 5.6 volts in time periods 302 and 304 and approximately 2.8 volts in time periods 306 and 308. Thus, the modulated voltage at node 220 and the control voltage at node 274 are approximately 180 degrees out of phase. Thus, during time periods 306 and 308, switching circuit 204 couples the modulated voltage at node 220, which is at a high voltage of approximately 5.6 volts, to load capacitor 210 at node 218, which cause load capacitor 210 to charge up to 5.6 volts. During time periods 302 and 304, switching circuit 204 decouples the modulated voltage at node 220, which is at a low voltage of approximately 2.8 volt, from node 218. The voltage on load capacitor 210 at node 218 may decrease during time periods 302 and 304 because of the current loading. However, the capacitance value of load capacitor 210 and the control signal frequency can be selected such that output voltage 216, which is provided by voltage up-conversion circuit 200 at node 218, does not fall below a DC voltage of, for example, 5.0 volts during time periods 302 and 304. The sequence of time periods 302, 304, 306, and 308 can continue to repeat such that voltage up-conversion circuit 200 can continue to convert a low voltage to a high voltage as discussed above.

Thus, voltage up-conversion circuit 200 converts a low voltage, such as voltage equal to approximately 2.8 volts, to a high voltage, such as a voltage equal to or greater than approximately 5 volts. Also, voltage up-conversion circuit 200 converts a low voltage to a high voltage by utilizing only low-voltage transistors having a reliability breakdown voltage that is less than the high voltage outputted by voltage up-conversion circuit 200. Furthermore, the voltage difference between any two terminals of any transistor in voltage up-conversion circuit 200 does not exceed the transistor's reliability breakdown voltage in period 302, 304, 306, or 308 in FIG. 3.

Figure 4:
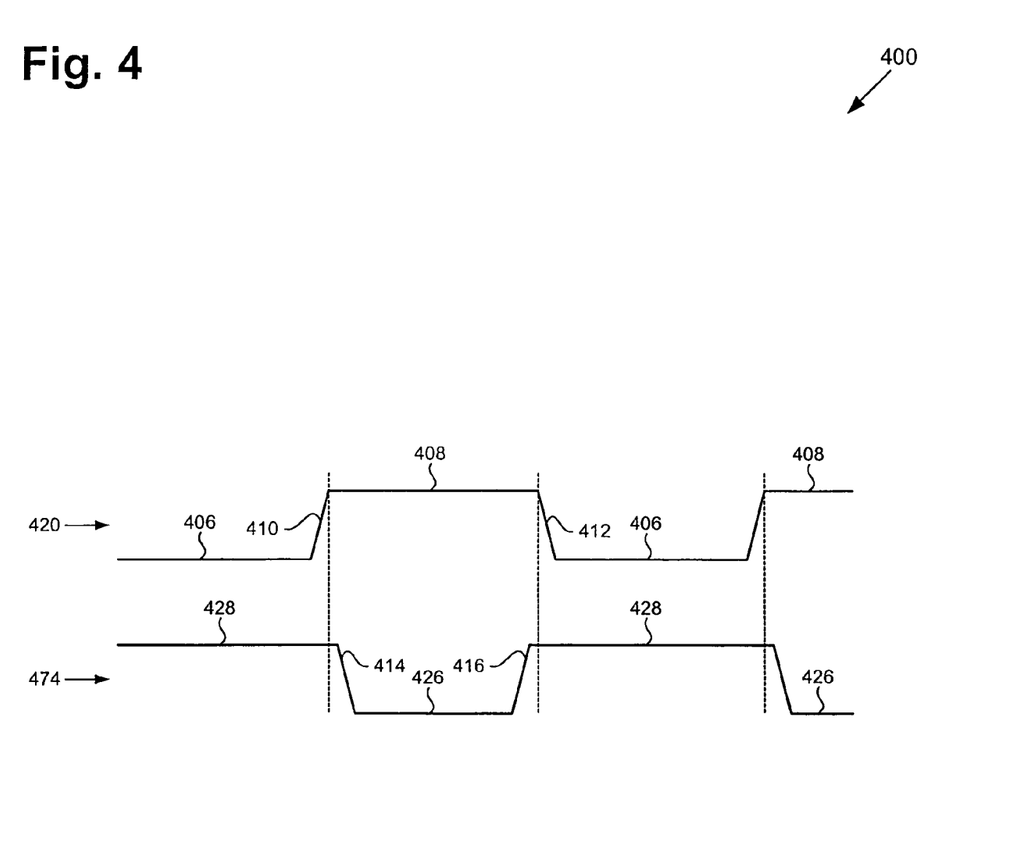
FIG. 4 illustrates a timing diagram including exemplary modulated and control voltages of respective exemplary modulated voltage generator and control circuits in accordance with one embodiment of the present invention.

FIG. 4 illustrates an exemplary timing diagram including exemplary modulated and control voltages outputted by respective exemplary modulated voltage generator and control circuits in accordance with one embodiment of the present invention. In FIG. 4, modulated voltage 420 corresponds to a modulated voltage provided by modulated voltage generator circuit 202 at node 220 in FIG. 2 and control voltage 474 corresponds to a control voltage provided by control circuit 208 at node 274 in FIG. 2. Timing diagram 400 includes modulated voltage 420 and control voltage 474.

As shown in FIG. 4, modulated voltage 420 alternates between low voltage level 406 and high voltage level 408 and includes rising edge 410 and falling edge 412. For example, low voltage level 406 can be approximately 2.8 volts and high voltage level 408 can be approximately 5.6 volts. Rising edge 410 of modulated voltage 420 is triggered by rising edge 314 of control signal 380 in FIG. 3 and falling edge 412 of modulated voltage 420 is triggered by rising edge 320 of control signal 382 in FIG. 3. Also shown in FIG. 4, control voltage 474 alternates between high voltage level 428 and low voltage level 426 and includes falling edge 414 and rising edge 416. For example, low voltage level 426 can be approximately 2.8 volts and high voltage level 428 can be approximately 5.6 volts.

Falling edge 414 of control voltage 474 is triggered by rising edge 316 of control signal 386 in FIG. 3 and rising edge 416 of control voltage 474 is triggered by rising edge 318 of control signal 384 in FIG. 3. Thus, rising edge 318 of control signal 384 needs to occur before rising edge 320 of control signal 382 to ensure that control voltage 474 transitions to high voltage level 428 to turn off transistor 260 in switching circuit 204 in FIG. 2 before modulated voltage 420 transitions to low voltage level 406, which prevents switching circuit 204 in FIG. 2 from coupling node 220 to node 218 when node 220 is at a low voltage level. Also, rising edge 314 of control signal 380 is ahead of rising edge 316 of control signal 386 to ensure that rising edge 410 of modulated voltage 420 will be ahead of falling edge 414 of control voltage 474, which ensures that transistor 260 in switching circuit 204 is opened only after modulated voltage 420 is at high voltage level 408.

Thus, as discussed above, the present invention's voltage up-conversion circuit converts a low input voltage to a higher output voltage by using low-voltage transistors, where each low-voltage transistor has a reliability breakdown voltage that is less than the up-converted output voltage. As a result, the present invention advantageously provides a voltage up-conversion circuit that can be manufactured at low cost and can be advantageously integrated in an analog and digital system in one semiconductor die.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

Thus, a voltage up-conversion circuit using low voltage transistors has been described.

The invention claimed is:

1. A voltage up-conversion circuit comprising:
a modulated voltage generator circuit configured to receive an input voltage and generate a modulated voltage;
a switching circuit configured to couple said modulated voltage to a load capacitor when said modulated voltage is at a high level and decouple said modulated voltage from said load capacitor when said modulated voltage is at a low level;
wherein said load capacitor reaches a voltage greater than a breakdown voltage of at least one transistor in said modulated voltage generator circuit.

2. The voltage up-conversion circuit of claim 1, wherein said load capacitor reaches a voltage greater than a breakdown voltage of at least one transistor in said switching circuit.

3. The voltage up-conversion circuit of claim 1 further comprising a control circuit coupled to said switching circuit, wherein said control circuit causes said switching circuit to couple said modulated voltage to said load capacitor when said modulated voltage is at said high level.

4. The voltage up-conversion circuit of claim 1 further comprising a control circuit coupled to said switching circuit, wherein said control circuit causes said switching circuit to decouple said modulated voltage from said load capacitor when said modulated voltage is at said low level.

5. The voltage up-conversion circuit of claim 3, wherein said load capacitor reaches a voltage greater than a breakdown voltage of at least one transistor in said control circuit.

6. The voltage up-conversion circuit of claim 4, wherein said load capacitor reaches a voltage greater than a breakdown voltage of at least one transistor in said control circuit.

7. The voltage up-conversion circuit of claim 1, wherein said breakdown voltage comprises a reliability breakdown voltage.

8. The voltage up-conversion circuit of claim 1, wherein a difference in voltage between any two terminals of said at least one transistor in said modulated voltage generator circuit is less than a reliability breakdown voltage of said at least one transistor.

9. The voltage up-conversion circuit of claim 1, wherein said at least one transistor in said modulated voltage generator circuit comprises at least one FET.

10. A modulated voltage generator circuit comprising:
an input node for receiving an input voltage;
an output node for providing a modulated voltage, said modulated voltage alternating between a low level and a high level;
a first transistor configured to isolate said output node from said input node when said modulated voltage is at said high level;
wherein said high level of said modulated voltage is greater than a breakdown voltage of said first transistor.

11. The modulated voltage generator circuit of claim 10, wherein said high level is substantially greater than said input voltage.

12. The modulated voltage generator circuit of claim 10 further comprising a first capacitor having a first terminal coupled to said output node and a second terminal coupled to a ground when said modulated voltage is at said low level.

13. The modulated voltage generator circuit of claim 10 further comprising a first capacitor having a first terminal coupled to said output node and a second terminal coupled to said input node when said modulated voltage is at said high level.

14. The modulated voltage generator circuit of claim 10, wherein said breakdown voltage of said first transistor comprises a reliability breakdown voltage.

15. The modulated voltage generator circuit of claim 10, wherein said first transistor comprises a PFET.

16. The modulated voltage generator circuit of claim 10, wherein said input voltage is approximately equal to said modulated voltage when said modulated voltage is at said low level.

17. A method for voltage up-conversion, said method comprising steps of:
using a modulated voltage generator circuit to generate a modulated voltage alternating between a low level and a high level;
coupling said modulated voltage to a load capacitor when said modulated voltage is at said high level;
wherein said load capacitor reaches a voltage greater than a reliability breakdown voltage of at least one transistor in said modulated voltage generator circuit.

18. The method of claim 17, wherein said at least one transistor is switchably controlled such that a voltage between terminals of said at least one transistor is less than said reliability breakdown voltage of said at least one transistor.

19. The method of claim 17, wherein said step of coupling said modulated voltage to said load capacitor utilizes a switching circuit to couple said modulated voltage to said load capacitor, and wherein said load capacitor reaches a voltage greater than a reliability breakdown voltage of at least one transistor in said switching circuit.

20. The method of claim 19, wherein said at least one transistor in said switching circuit is controlled by a control circuit, and wherein said load capacitor reaches a voltage greater than a reliability breakdown voltage of at least one transistor in said control circuit.

* * * * *